(12) United States Patent
Skupinski et al.

(10) Patent No.: US 6,558,293 B2
(45) Date of Patent: May 6, 2003

(54) GARAGE SHIFT CONTROL FOR A MOTOR VEHICLE AUTOMATIC TRANSMISSION

(75) Inventors: Paul Skupinski, Farmington Hills, MI (US); David Morganroth, Gaines, MI (US); Marek L. Wilmanowicz, Pinckney, MI (US); Sheryl Page, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 16 days.

(21) Appl. No.: 09/877,743

(22) Filed: Jun. 11, 2001

(65) Prior Publication Data

US 2002/0187877 A1 Dec. 12, 2002

(51) Int. Cl.$^7$ ............................ F16H 59/60; G06F 17/00
(52) U.S. Cl. ............................................. 477/97; 701/55
(58) Field of Search .................... 701/51, 55; 477/109, 477/111, 122, 97, 98; 74/335

(56) References Cited

U.S. PATENT DOCUMENTS

| | | | | |
|---|---|---|---|---|
| 5,408,895 A | * | 4/1995 | Chan et al. ................... 74/335 |
| 5,416,700 A | * | 5/1995 | Bates et al. ............... 477/97 X |
| 5,737,712 A | * | 4/1998 | Han et al. ..................... 701/51 |
| 5,761,628 A | * | 6/1998 | Steeby et al. ............. 74/335 X |
| 5,875,410 A | * | 2/1999 | Fowler et al. ............ 701/51 X |
| 6,024,668 A | * | 2/2000 | Holbrook et al. .............. 477/98 |
| 6,126,569 A | * | 10/2000 | Genise ......................... 477/91 |
| 6,185,494 B1 | * | 2/2001 | Wadas .......................... 701/51 |
| 6,295,498 B1 | * | 9/2001 | Gleason et al. ............... 701/55 |
| 6,394,931 B1 | * | 5/2002 | Genise ......................... 477/97 |
| 6,412,361 B1 | * | 7/2002 | Wolf et al. ............... 74/336 R |
| 6,415,214 B2 | * | 7/2002 | Nishimura et al. ........... 701/51 |

* cited by examiner

*Primary Examiner*—Saul Rodriguez
*Assistant Examiner*—Roger Pang
(74) *Attorney, Agent, or Firm*—Christopher DeVries

(57) ABSTRACT

An improved powertrain control minimizes output torque disturbances due to garage shifting. Under certain predefined conditions, garage shifts to the forward or Drive range are carried out by initially commanding a shift to an upper forward gear ratio having a relatively low torque advantage, and then commanding a shift from the upper forward gear ratio to a lower forward ratio that is ordinarily used to launch the vehicle. The shift from the upper gear ratio to the lower gear ratio is initiated when the initial shift is substantially complete or when a predetermined period of time has elapsed since shift initiation. Engine management controls are also used to reduce the transmission input torque during garage shifts to both forward and reverse ranges.

6 Claims, 2 Drawing Sheets

GARAGE SHIFT CONTROL FOR A MOTOR VEHICLE AUTOMATIC TRANSMISSION

TECHNICAL FIELD

This invention relates to garage shifting of a motor vehicle automatic transmission and, more particularly, to a shift control method that minimizes output torque disturbances due to garage shifting.

BACKGROUND OF THE INVENTION

In general, a motor vehicle automatic transmission includes a number of gear elements and hydraulically-controlled friction elements (referred to herein as clutches) that are selectively engaged or disengaged according to a predetermined schedule for establishing a desired gear ratio between the transmission input and output shafts. In gear ratio shifting, various hydraulic and/or electro-hydraulic mechanisms are designed to control the clutch flow and pressure so that the shift is substantially imperceptible to the vehicle occupants. This is particularly important in the case of range or garage shifts since the gear element lash can be significant (especially in all-wheel-drive vehicles), and an objectionable driveline torque disturbance can occur if the gear lash is taken up too quickly. Various hydraulic flow control mechanisms can be employed to reduce fluid flow during garage shifting, but such mechanisms can add considerable cost to the transmission, and introduce durability concerns under cold temperature and high input torque conditions. Accordingly, what is needed is a cost-effective way of minimizing garage shift driveline torque disturbance without compromising the durability of the transmission friction elements.

SUMMARY OF THE INVENTION

The present invention is directed to an improved control method for a motor vehicle automatic transmission that minimizes output torque disturbances due to garage shifting. Under certain predefined conditions, garage shifts to the forward (Drive) range are carried out by initially commanding a shift to an upper forward gear ratio having a relatively low torque advantage to smoothly condition the transmission gearset for forward operation, and then commanding a shift from the upper forward gear ratio to a lower forward ratio that is ordinarily used to launch the vehicle. The shift from the upper gear ratio to the lower gear ratio is initiated when the initial shift is substantially complete or when a predetermined period of time has elapsed since shift initiation. Engine management controls are also used to reduce the transmission input torque during garage shifts to both forward and reverse ranges.

DESCRIPTION OF THE PREFERRED EMBODIMENT

Figure 1:
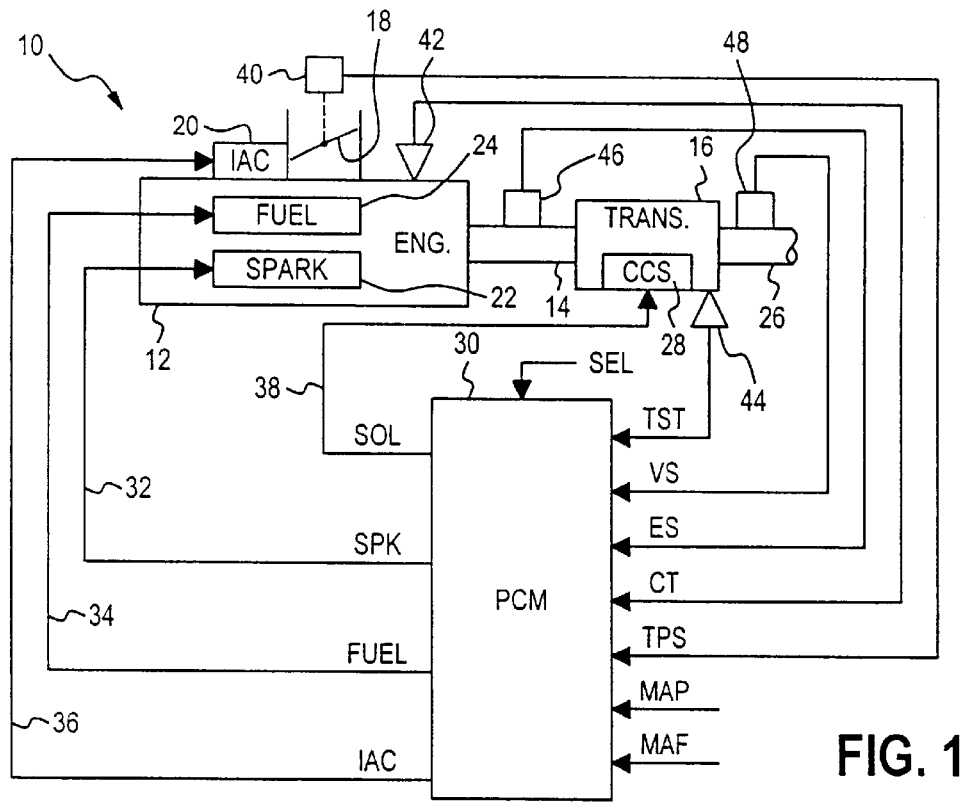
FIG. 1 is a schematic diagram of a vehicle powertrain, including an electronic control unit programmed to carry out the control method of this invention.

Referring to the drawings, and particularly to FIG. 1, the reference numeral 10 generally designates a vehicle drive train including an engine 12 having an output shaft 14 coupled to a multiple-speed ratio automatic transmission 16. Engine 12 includes a driver-manipulated throttle 18, an idle air control (IAC) mechanism 20, and conventional spark and fuel control mechanisms 22, 24 adapted to receive spark and fuel control signals (SPK, FUEL) for controlling spark timing and fuel delivery functions. Transmission 16 includes a fluid coupling (such as a torque converter) connected between engine output shaft 14 and a transmission input shaft (not shown), a number of gear elements connecting the transmission input shaft to drive shaft 26, and a set of clutch control solenoids (CCS) 28 that are electrically activated according to a predetermined schedule by a solenoid control signal (SOL) for establishing a desired gear ratio between the transmission input shaft and drive shaft 26. A driver-manipulated range selector (not shown) produces a signal SEL, and is mechanically coupled to transmission 16 for porting hydraulic fluid to enable shifting to a selected range, such as Forward, Neutral or Reverse.

The engine spark and fuel control mechanisms 22, 24, the IAC mechanism 20, and the clutch control solenoids (CCS) 28 are activated by a microprocessor-based powertrain control module (PCM) 30, which develops the SPK, FUEL, IAC and SOL control signals on lines 32, 34, 36 and 38, respectively. The PCM 30 is generally conventional, and operates in response to a number of input signals representative of the selected transmission range SEL, transmission sump temperature TST, vehicle speed VS, engine speed ES, engine coolant temperature CT, engine throttle position TPS, intake manifold absolute pressure MAP, and intake mass air flow MAF. The input signals are derived from conventional sensors, including the throttle position sensor 40, the temperature sensors 42, 44, and the speed sensors 46, 48.

Figure 2:
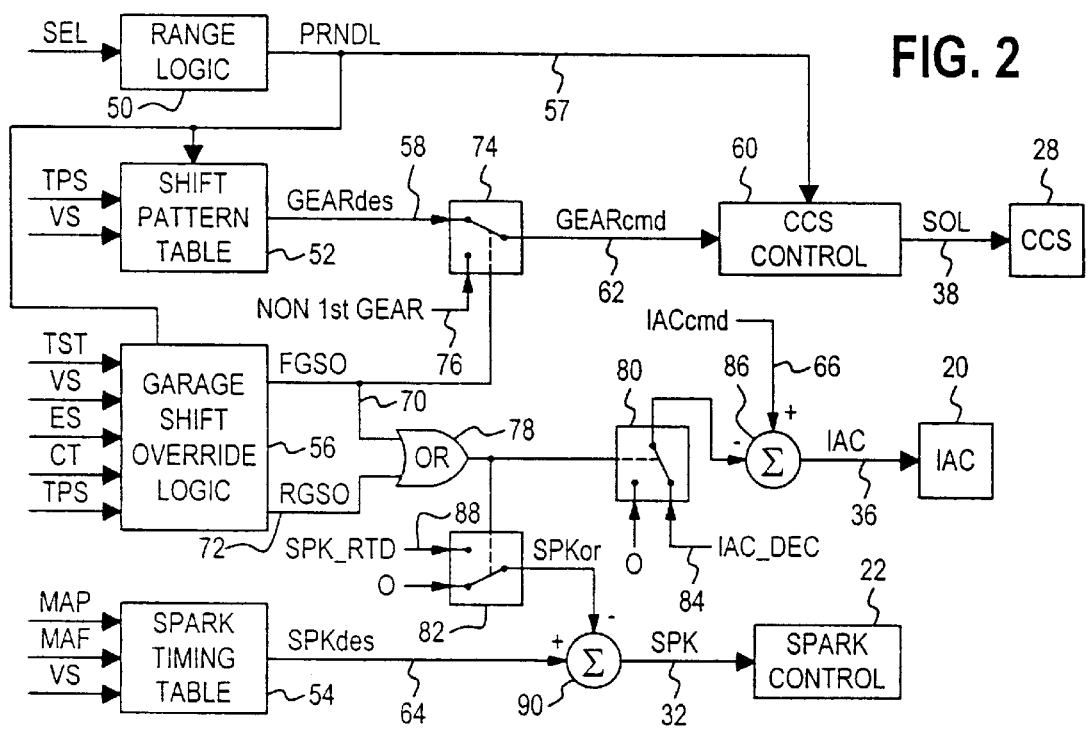
FIG. 2 is a block diagram illustrating the control method of this invention.
Figure 3:
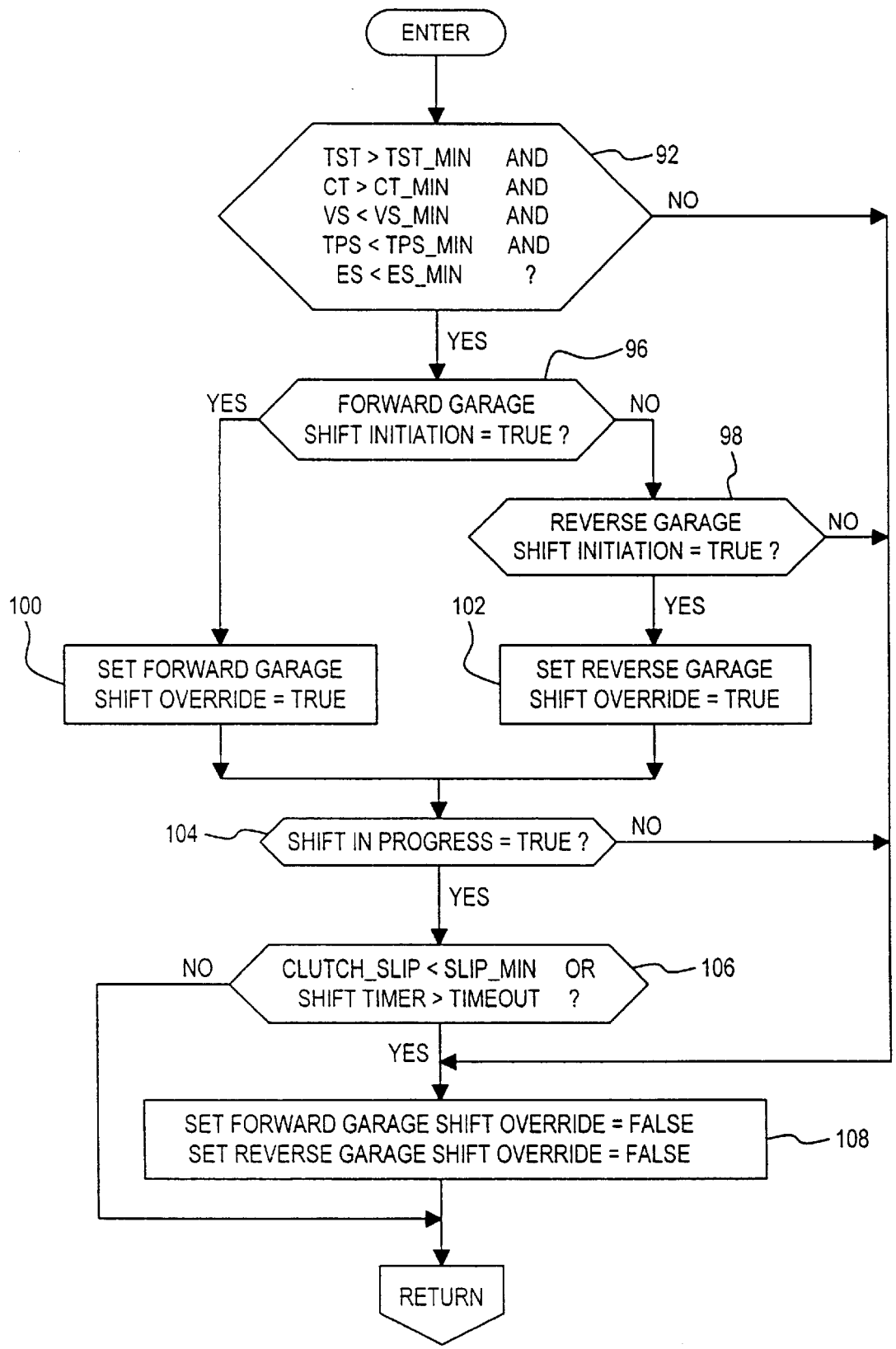
FIG. 3 is a flow diagram representative of computer program instructions executed by the electronic control unit of FIG. 1 in carrying out one of the functions illustrated in the block diagram of FIG. 2.

The present invention is directed to a control carried out by PCM 30 for overriding the normal engine and transmission control methodology under specified conditions for reducing driveline torque disturbances due to garage shifting, and is illustrated by the block diagram of FIG. 2 and the flow diagram of FIG. 3. Referring to FIG. 2, the base powertrain control algorithms include a Range Logic block 50 responsive to the selected transmission range SEL, a Shift Pattern Table 52 for selecting a desired forward gear ratio GEARdes based on TPS and VS when the forward range is selected, and a Spark Timing Table 54 for selecting a desired spark advance SPKdes for engine 12 based on MAP, MAF and VS. The Garage Shift Override Logic block 56 is responsive to a number of inputs including the selected transmission range SEL, transmission sump temperature TST, vehicle speed VS, engine speed ES, engine coolant temperature CT, and engine throttle position TPS, for enabling an override of the base powertrain control algorithms when the range selector input SEL indicates that the driver has initiated a garage shift.

The Range Logic block 50 simply analyzes the range selector signal SEL, and produces an output on line 57 indicative of the selected range; such output is designated in FIG. 2 as PRNDL, where the letters P, R, N, D and L indicate the Park, Reverse, Neutral, Drive and Low ranges. Thus, so-called garage shifts are defined as changes from Neutral or Park to Reverse or to a Forward range such as Drive or Low, and from a Forward range to Reverse (or vice versa).

The Shift Pattern Table 52 is activated when the driver has selected a Forward range (D or L), and selects an appropriate forward gear ratio. Most automatic transmissions provide four different gear ratios, typically referred to as first, second, third and fourth; the first ratio is also referred to generally as the lowest gear because it provides the lowest output/input speed ratio, while the fourth ratio is referred to as the highest gear because it provides the highest output/input speed ratio. Of course, the torque ratios are just the opposite the first gear provides the highest output/input torque advantage, whereas the fourth gear provides the lowest output/input torque advantage. Thus, the Shift Pattern Table generally selects the first gear at vehicle launch due to the high torque advantage it provides, and then successively higher speed ratios are selected as the vehicle speed VS increases, for a given engine throttle setting TPS.

The Shift Pattern Table 52 produces a selected gear ratio GEARdes signal on line 58 which, in the absence of an override condition, is applied as gear command GEARcmd to the CCS Control block 60 via line 62 for actuating the corresponding clutch control solenoids 28. Similarly, the Spark Timing Table 54 produces a desired spark advance signal SPKdes on line 64 that is applied as spark control signal SPK to spark control mechanism 22 in the absence of an override condition; and an idle air control command IACcmd developed on line 66 is applied as the idle air control signal IAC to IAC mechanism 20 in the absence of an override condition.

The Garage Shift Override Logic block 56 analyzes the various inputs mentioned above, and activates the forward garage shift override signal FGSO on line 70 when the range signal on line 57 indicates driver initiation of a garage shift to a Forward range, and activates the reverse garage shift override signal RGSO on line 72 when the range signal on line 57 indicates driver initiation of a garage shift to the Reverse range. The FGSO signal on line 70 controls the state of switch 74 so that in the event of a forward garage shift override, the gear command GEARcmd applied to CCS Control block 60 is determined according to the Non-First-Gear input on line 76 instead of the desired gear signal GEARdes on line 58. The Non-First-Gear input designates a forward gear ratio that is higher than first; second gear is most appropriate in some transmissions, while third gear is most appropriate in other transmissions. The FGSO and RGSO signals are both applied as inputs to OR-Gate 78, the output of which is applied as an input to switches 80 and 82. Thus, if either the forward garage shift override or the reverse garage shift override signals are activated, the switches 80 and 82 change state to override the normal engine idle air and spark advance control signals IAC and SPK. In the case of the idle air control, activation of the switch 80 introduces an idle air adjustment IAC_DEC on line 84 that is applied to summation block 86 along with IACcmd to reduce the idle air control signal IAC by the adjustment amount IAC_DEC; this incrementally reduces the engine idle speed and, hence, the input torque applied to transmission 16. In the case of the spark timing control, activation of the switch 82 introduces a spark retard quantity SPK_RTD on line 88 that is applied to summation block 90 along with SPKdes to retard the spark control signal SPK by the quantity SPK_RET; this retards the engine spark timing and, hence, also reduces the input torque applied to transmission 16.

The input signal analysis performed by Garage Shift Override Logic block 56 of FIG. 2 is illustrated by the flow diagram of FIG. 3, which represents a routine periodically executed by PCM 30 in the course of engine operation. The block 92 is first executed to determine if various override criteria are met; specifically, the transmission sump temperature TST must exceed a minimum value TST_MIN, the coolant temperature CT must exceed a minimum value CT_MIN, the vehicle speed VS must be below a minimum value VS_MIN, the engine throttle position TPS must be below a minimum value TPS_MIN, and the engine speed ES must be below a minimum value ES_MIN. If one or more of the conditions is not met, the block 108 is executed to set the FORWARD GARAGE SHIFT OVERRIDE and the REVERSE GARAGE SHIFT OVERRIDE flags to FALSE before exiting the routine. If all of the conditions identified at block 92 are met, the blocks 96 and 98 determine if a forward garage shift (that is, a garage shift to a Forward range) or a reverse garage shift (that is, a garage shift to the Reverse range) is being initiated by the driver. If neither condition is true, the block 108 is executed to complete the routine, as described above. If a forward garage shift is being initiated, the block 100 sets the FORWARD GARAGE SHIFT OVERRIDE flag (FGSO in FIG. 2) to TRUE; if a reverse garage shift is being initiated, the block 102 sets the REVERSE GARAGE SHIFT OVERRIDE flag (RGSO in FIG. 2) to TRUE. The blocks 104 and 106 are then executed to determine if the FGSO and RGSO flags should be set to FALSE to terminate the override condition. The block 104 determines if the garage shift is still in progress; if not, the block 108 is executed to set the FORWARD GARAGE SHIFT OVERRIDE and the REVERSE GARAGE SHIFT OVERRIDE flags to FALSE before exiting the routine. The block 106 determines if the slip speed of the on-coming clutch (that is the clutch associated with Non-First-Gear) is less than a minimum value SLIP_MIN or the elapsed time of the shift (SHIFT TIMER) exceeds a TIMEOUT threshold. When either condition is met, the block 108 is executed to set the FORWARD GARAGE SHIFT OVERRIDE and the REVERSE GARAGE SHIFT OVERRIDE flags to FALSE before exiting the routine. Other conditions in addition to those mentioned in blocks 104 and 106 may be used to terminate the override condition if desired, such as the passage of a specified time after the driver releases the vehicle service brakes.

In summary, the control of this invention provides a practical and cost-effective solution for minimizing output torque disturbances due to garage shifting. When the driver initiates a garage shift, the engine output torque is reduced to reduce the transmission input torque; and in the case of a forward garage shift, the transmission is initially and temporarily commanded to a higher gear ratio than first to reduce the torque advantage of the transmission gearset and smoothly condition the transmission gearset for forward operation. The control may be carried out exclusively in software as indicated, so that no additional or dedicated hardware is required. Also, the control is essentially transparent to the driver, including the shift from the non-first-gear to first gear when the override is terminated. While described in reference to the illustrated embodiment, it is expected that various modifications in addition to those mentioned above will occur to those skilled in the art. For example, the override engine controls may be ramped in and/or out to minimize transients, the control may be carried out with different powertrain configurations than described in FIG. 1, and so on. In this regard, it will be understood that the scope of this invention is not limited to the illustrated embodiment, and that control methods incorporating such modifications may fall within the scope of this invention, which is defined by the appended claims.

What is claimed is:

1. A control method for a motor vehicle automatic transmission having forward, neutral and reverse ranges, the forward range including a lower gear ratio normally engaged to launch the vehicle and an upper gear ratio normally engaged subsequent to vehicle launch, and a driver-controlled range selection input for establishing a desired transmission range, the control method comprising the steps of:

detecting a driver-controlled change from the reverse or neutral ranges to the forward range under predefined vehicle launch conditions;

overriding a normal control of said transmission in response to such detection by initially engaging said upper gear ratio to condition said transmission for operation in said forward range; and then terminating the overriding of the normal control by engaging said lower gear ratio to complete the vehicle launch.

2. The control method of claim 1, wherein an engine supplies input torque to said transmission, and the control method includes the steps of:

detecting a driver-controlled change to said forward or reverse ranges; and in response to such detection, overriding a normal control of said engine so as to reduce the input torque supplied to said transmission.

3. The control method of claim 1, wherein said transmission receives input torque from an engine having a driver-controlled throttle, and said predefined vehicle launch conditions include one or more of the following: (1) an engine throttle setting lower than a predefined setting, (2) a vehicle speed lower than a predefined vehicle speed, and (3) an engine speed lower than a predefined engine speed.

4. The control method of claim 3, wherein said predefined vehicle launch conditions include one or more of the following: (1) an engine temperature above a predefined engine temperature, and (2) a transmission temperature above a predefined transmission temperature.

5. The control method of claim 1, wherein the step of terminating the overriding of the normal transmission control is initiated when a predetermined time after initiating engagement of said upper gear ratio has elapsed.

6. The control method of claim 1, wherein the step of terminating the overriding of the normal transmission control is initiated when a transmission clutch slippage during engagement of said upper gear ratio falls below a reference slip.

\* \* \* \* \*